United States Patent [19]
Kido et al.

[11] Patent Number: 5,849,822
[45] Date of Patent: Dec. 15, 1998

[54] THERMOPLASTIC RESIN COMPOSITION SUPERIOR IN TRANSPARENCY AND ANTISTATIC PROPERTY

[75] Inventors: Nobuaki Kido; Shunichi Matsumura; Takashi Ito, all of Iwakuni, Japan

[73] Assignee: Teijin Limited, Japan

[21] Appl. No.: 694,274

[22] Filed: Aug. 8, 1996

[30] Foreign Application Priority Data

Aug. 17, 1995 [JP] Japan .................................. 7-209506
Oct. 23, 1995 [JP] Japan .................................. 7-274079
Nov. 24, 1995 [JP] Japan .................................. 7-305721

[51] Int. Cl.$^6$ .............................. C08K 5/42; C08L 31/00; C08L 33/04; C08L 53/00
[52] U.S. Cl. .................. 524/159; 524/162; 524/606; 524/912; 525/94; 525/439; 525/444
[58] Field of Search ..................... 524/159, 160, 524/161, 162, 912, 606; 525/439, 444, 94

[56] References Cited

U.S. PATENT DOCUMENTS

| | | | |
|---|---|---|---|
| 3,546,008 | 12/1970 | Shields et al. | 525/444 |
| 4,006,123 | 2/1977 | Samuelson et al. | |
| 4,035,346 | 7/1977 | Samuelson et al. | |
| 4,336,685 | 6/1982 | Eisenstein | 525/444 |
| 4,600,743 | 7/1986 | Shizuki et al. | 524/606 |
| 4,791,158 | 12/1988 | Lausberg et al. | 525/439 |
| 5,070,178 | 12/1991 | Yawadi | 525/444 |
| 5,288,781 | 2/1994 | Song et al. | 525/444 |
| 5,300,332 | 4/1994 | Kawaguchi et al. | 525/444 |
| 5,494,952 | 2/1996 | Hirata et al. | 524/161 |
| 5,539,055 | 7/1996 | Nishimoto et al. | 524/160 |
| 5,602,195 | 2/1997 | Kim et al. | 524/161 |

FOREIGN PATENT DOCUMENTS

| | | |
|---|---|---|
| 0 493 008 | 7/1992 | European Pat. Off. . |
| 47-40873 | 10/1972 | Japan . |
| 50-121336 | 9/1975 | Japan . |
| 50-134086 | 10/1975 | Japan . |
| 60-179927 | 9/1985 | Japan . |
| 62-230835 | 10/1987 | Japan . |
| 62-273252 | 11/1987 | Japan . |
| 63-264627 | 11/1988 | Japan . |
| 64-14268 | 1/1989 | Japan . |
| 5-97984 | 4/1993 | Japan . |
| 5-171024 | 7/1993 | Japan . |
| 5-222241 | 8/1993 | Japan . |
| 6-57153 | 3/1994 | Japan . |
| 6-65508 | 3/1994 | Japan . |
| 6-123011 | 5/1994 | Japan . |
| 6-228420 | 8/1994 | Japan . |
| 7-133416 | 5/1995 | Japan . |
| 1176648 | 1/1970 | United Kingdom . |

OTHER PUBLICATIONS

*Chemical Abstracts*, vol. 85, no. 6 abstract no. 34213s (abstract of JP 51–031783) (Aug. 1976).
*Patent Abstracts of Japan*, vol. 11, no. 268 (C–444) (abstract of JP 62–070444) (Mar. 1987).
*Patent Abstracts of Japan*, vol. 17, no. 025 (C–1017) (abstract of JP 04–248843) (Sept. 1992).
*Patent Abstracts of Japan*, vol. 18, no. 313 (C–1212) (abstract of JP 06–065508) (Mar. 1994).

Primary Examiner—Veronica P. Hoke
Attorney, Agent, or Firm—Wenderoth, Lind & Ponack, L.L.P.

[57] ABSTRACT

A thermoplastic resin composition having transparency and antistatic properties, comprising 100 parts by weight of a thermoplastic resin (A) having a refractive index of 1.52 to 1.61 and a haze of 40 or less, and 5 to 40 parts by weight of a polyetherester (B) which has a sulfonate group and a polyalkylene oxide group, and is substantially immiscible with the thermoplastic resin (A), the difference in refractive index between the thermoplastic resin (A) and the polyetherester (B) being 0.04 or less. The thermoplastic resin composition has a haze of 40% or less and a surface resistivity of $1 \times 10^{10}$ to $1 \times 10^{14}$ ohm/square.

21 Claims, No Drawings

THERMOPLASTIC RESIN COMPOSITION SUPERIOR IN TRANSPARENCY AND ANTISTATIC PROPERTY

DETAILED DESCRIPTION OF THE INVENTION

The present invention relates to a thermoplastic resin composition superior in transparency and antistatic property.

Plastics that have various excellent properties are in use as electric or electronic materials, automobile materials, materials for medical care, articles for daily use and various other molded articles. Plastics generally have a high electrical insulating property, which in turn invites various problems. That is, static electricity is not easily dissipated from the plastics electrostatically charged and hence, there occur various problems such as adhesion of dust on a plastic product, electric shock given to user or operator of the product, malfunctioning of meters or IC chips, etc. Therefore, studies have been made on methods for preventing plastics from being statically charged.

The methods for prevention of static build-up of plastics include a method of internal addition of an antistatic agent and a method of coating of an antistatic agent. Since the method of coating of an antistatic agent requires an extra step for coating, the method of internal addition of an antistatic agent is advantageous in view of the production process.

In the method of internal addition of an antistatic agent, a method to incorporate an ionic surfactant such as alkylsulfonic acid salt or alkylbenzenesulfonic acid salt into a polymer has been widely employed because of excellency in effect and economy.

Among them, systems using an alkyl(aryl)sulfonic acid salt as an ionic surfactant were investigated widely. As ionic surfactants having a high antistatic effect, there are disclosed the one containing a compound obtained by substituting the secondary position of an alkane with a sulfonic acid metal salt [Japanese Kokai (Laid-Open) Patent Application No. 5-222241] and the one containing a phosphonium salt [Japanese Kokai (Laid-Open) Patent Application No. 62-230835]. In these methods using a low-molecular surfactant, however, the surfactant bleeds out on the resin surface and in consequence, its antistatic effect, although it is high, is reduced when the surface is wiped or water-washed.

Meanwhile, in order to endow a resin with a permanent antistatic effect with the transparency being maintained, it is proposed to bond chemically the terminal of a polymer with a phosphonium salt of a phenolsulfonic acid to endow the resulting polymer with a permanent antistatic property [Japanese Kokai (Laid-Open) Patent Applications Nos. 63-264627 and 64-14268]. In these approaches, a permanent antistatic effect can be obtained surely; however, because of use of the chemical bonding at the polymer terminals, a polymer of high polymerization degree results in lowering of the antistatic effect, and if the number of bonded terminals having antistatic property is increased with a view to raise antistatic effect, it results in reduction in other physical properties.

As approaches for obtaining a permanent antistatic effect which is not lost even after water washing, there are disclosed the following methods which comprise adding an antistatic polymer into a resin. That is, Japanese Kokai (Laid-Open) Patent Application No. 62-273252 discloses addition of a polyether ester amide, as an antistatic polymer to a resin comprising a polycarbonate and a polystyrene-based polymer; Japanese Kokai (Laid-Open) Patent Application No. 5-97984 discloses, as a polymeric antistatic agent, a graft polymer consisting of a polyamide as a backbone polymer and a block polymer, as a branched polymer, composed of a polyalkylene ether and a polyester, and described the surface resistivity-reducing effect of the graft polymer; United States Patent Nos. 4006123 and 4035346 disclose an antistatic polyamide containing, in the molecule, a phosphonium salt of an aromatic sulfonic acid and having a glass transition temperature of 25° C. or less.

Each of these antistatic polymers, however, must be added to a resin in a relatively large amount for obtaining a high antistatic effect. This poses various problems. That is, the heat resistance and mechanical properties inherently possessed by the resin are impaired; particular structure of each antistatic polymer makes high its production cost; and such a low glass transition temperature of the polymer makes difficult its handling.

Japanese Kokai (Laid-Open) Patent Application No. 6-57153 discloses an antistatic resin composition comprising 99 to70 parts by weight of a thermoplastic resin and 1 to 30 parts by weight of a polyether ester obtained by condensing a poly(alkylene oxide) glycol having a number-average molecular weight of 200 to 20,000, a glycol having 2 to 8 carbon atoms, and a polyvalent carboxylic acid having 4 to 20 carbon atoms and/or a polyvalent carboxylic acid ester.

Japanese Kokai (Laid-Open) Patent Application No. 6-65508 discloses an antistatic resin composition in which the resin composition disclosed in the above Japanese Kokai (Laid-Open) Patent Application No. 6-57153 further comprises a metal salt of a sulfonic acid, represented by the following formula $$R-SO_3M$$

wherein R is an alkyl group, an alkylaryl group or an aryl group, and M is an alkali metal or an alkaline earth metal.

Japanese Kokai (Laid-Open) Patent Application No. 5-171024 discloses a polycarbonate resin composition superior in transparency and antistatic performance, comprising 100 parts by weight of a polycarbonate resin, 0.1 to 20 parts by weight of a phosphonium salt of a sulfonic acid and 0.01 to 3.0 parts by weight of a sulfur-containing ester compound.

Japanese Kokai (Laid-Open) Patent Application No. 6-228420 disclosed an aromatic polycarbonate resin composition having excellent antistatic properties, while retaining transparency, comprising 100 parts by weight of an aromatic polycarbonate resin, 0.1 to 10 parts by weight of an amine salt of a sulfonic acid and 0.001 to 0.3 part by weight of a metal salt of a sulfonic acid.

Japanese Kokai (Laid-Open) Patent Application No. 7-133416 disclosed a polycarbonate resin composition superior in transparency and antistatic property, comprising 100 parts by weight of a polycarbonate resin and 0.1 to 10 parts by weight of a phosphonium salt as an antistatic agent.

Further, the following are prior arts disclosing polyester ethers, which are not always related to antistatic properties.

Japanese Patent Publication No. 47-40873 discloses a water-dissipatable polyester ether having an intrinsic viscosity of at least 0.3, obtained from at least one dicarboxylic acid, a diol containing at least 20 mole % of a polyethylene glycol represented by the following formula $$H-(OCH_2CH_2)_n-OH$$

wherein n is an integer of 2 to 10, and a dicarboxylic acid, a diol or an ester-formable derivative thereof, each having a group bonded to the aromatic ring, represented by the following formula

—SO$_3$M wherein M is a hydrogen atom or a metal ion. According to the literature, the polyester ether is useful as a sizing agent or an adhesive.

Japanese Kokai (Laid-Open) Patent Application No. 50-121336 discloses a polyester ether-based adhesive obtained by copolymerizing a polyester segment composed of a dicarboxylic acid, at least 50 mole % of which is an aromatic dicarboxylic acid, and/or an ester-formable derivative thereof, 2 to 40 mole %, based on the total of the dicarboxylic acid components, of an ester-formable alkali metal sulfonate, and a glycol, with 20 to 60% by weight, based on the formed polymer, of a polyethylene glycol having a molecular weight of 600 to 6,000.

Japanese Kokai (Laid-Open) Patent Application No. 50-134086 discloses a laminated film obtained by laminating, on at least one surface of a biaxially oriented polyester film, a polyester ether having almost the same composition as the polyester ether disclosed in the above Japanese Kokai (Laid-Open) Patent Application No.. 50-121336.

Japanese Kokai (Laid-Open) Patent Application No.. 6-123011 discloses a hygroscopic polyester fiber comprising a tercopolymer component composed of an alkylene terephthalate represented by the following formula

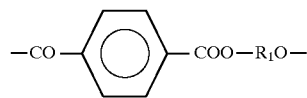

wherein $R_1$ is an alkylene group having 2 to 4 carbon atoms, an alkylene sulfoisophthalate represented by the following formula

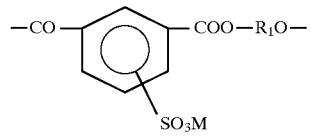

wherein $R_1$ has the same definition as given above, and M is a metal ion, and a polyoxyalkylene glycol having a number-average molecular weight of 300 to 20,000, and a block polyether ester component represented by the following formula

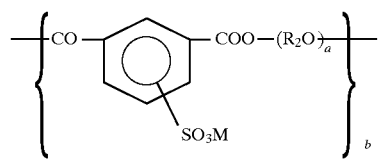

wherein $R_2$ is an alkylene group having 2 to 4 carbon atoms; M has the same definition as given above; a is an integer of 3 to 100; and b is an integer of 1 to 10, in such proportions as to satisfy the following four formulas $A \geq 60$ $1 \leq B \leq 10$ $0.2 \leq C/B \leq 5.0$ $0.5 \leq D/B \leq 4.0$ wherein A is wt. % of the alkylene terephthalate; B is wt. % of the alkylene sulfoisophthalate; C is wt. % of the polyoxyalkylene glycol; and D is wt. % of the block polyether ester component and containing as the metal ion of the sulfoisophthalate of the above expression, a metal ion having a value of 1.5 or more obtained by dividing the valency of the ion by the radius (Å) of the metal ion, in an amount of at least 0.1 gram ion per kg of the fiber weight An object of the present invention is to provide a thermoplastic resin composition superior in transparency and antistatic properties.

Other object of the present invention is to provide a thermoplastic resin composition which has a permanent antistatic effect which does not lower even by water washing, wiping, etc., which has transparency, and which has good mechanical properties, moldability and heat resistance.

Still other objects and advantages of the present invention will become apparent from the following description.

According to the present invention, the above objects and advantages of the present invention can be achieved by a thermoplastic resin composition superior in transparency and antistatic property, comprising:

100 parts by weight of a thermoplastic resin (A) having a refractive index of 1.52 to 1.61 and a haze of 40% or less, and 5 to 40 parts by weight of a polyether ester (B) which is substantially immiscible with the thermoplastic resin (A) and which is composed mainly of:

(B1) an aromatic dicarboxylic acid component not having sulfonic acid salt group, (B2) at least one compound component having a sulfonic acid salt group, selected from the group consisting of a dicarboxylic acid compound component represented by the following formula (1)

wherein Ar is a trivalent aromatic group having 6 to 20 carbon atoms, and M$^+$ is a metal ion, a tetraalkylphosphonium ion or a tetraalkylammonium ion)

and a glycol compound component represented by the following formula (2)

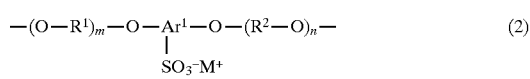

wherein $R^1$ and $R^2$ are each independently a bivalent alkylene group having 2 to 4 carbon atoms; m and n are each independently an integer of 1 to 20; Ar$^1$ is a trivalent aromatic group having 6 to 20 carbon atoms; and M$^+$ is a metal ion, a tetraalkylphosphonium ion or a tetraalkylammonium ion, (B3) a glycol component having 2 to 10 carbon atoms, and (B4) at least one polyalkylene oxide component having a number-average molecular weight of 200 to 50,000, selected from the group consisting of a poly(alkylene oxide) glycol component, a poly(alkylene oxide) glycol bis(carboxymethyl) ether component and a polyoxyalkylene glycol mono-2,3-dihydroxypropyl ether component, in which thermoplastic resin composition the difference in refractive index between the thermoplastic resin (A) and the polyether ester (B) is 0.04 or less and which thermoplastic resin composition has a haze of 40 % or less and a surface resistivity of $1\times10^{10}$ to $1\times10^{14}$ ohm/square.

As mentioned above, the thermoplastic resin composition of the present invention comprises a thermoplastic resin (A) and a polyether ester (B).

The thermoplastic resin (A) must have a refractive index of 1.52 to 1.61 and a haze of 40% or less. Preferred examples of the thermoplastic resin (A) are a polycarbonate, a polyethylene terephthalate, a polyethylene naphthalenedicarboxylate, a polyvinyl chloride, a polystyrene, a poly(acrylonitrile/styrene), a poly(methyl methacrlylate/styrene) and a poly(acrylonitrile/styrene/butadiene).

The polycarbonate is preferably one composed mainly of the recurring units represented by the following formula (4)

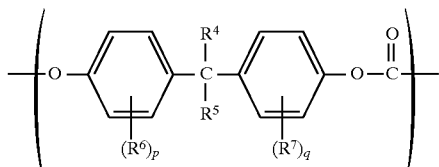

wherein $R^4$ and $R^5$ are each independently a hydrogen atom, an alkyl group having 1 to 5 carbon atoms or a cycloalkyl group having 5 to 6 carbon atoms, or $R^4$ and $R^5$ may be bonded with each other to form a cycloalkylidene group together with the carbon atom to which they bond; $R^6$ and $R^7$ are each independently an alkyl group having 1 to 5 carbon atoms, a halogen atom or a phenyl group; and p and q are each 0, 1 or 2.

These recurring units can be present singly or in combination of two or more in the molecular chain of the polycarbonate.

In the formula (4), the alkyl group having 1 to 5 carbon atoms may have a straight chain or a branched chain and is selected from, for example, methyl, ethyl, n-propyl, isopropyl, n-butyl, isobutyl, sec-butyl, tert-butyl and n-pentyl. Examples of the cycloalkyl group having 5 to 6 carbon atoms include cyclopentyl and cyclohexyl. The alkylidene group is selected from, for example, cyclopentylidene and cyclohexylidene. The halogen atom may be, for example, chlorine, bromine or iodine.

The polycarbonate preferably contains the recurring units represented by the formula (4) in an amount of 80 to 100 mole %. 20 Mole % or less of the total recurring units can be those recurring units represented by, for example, the following formula (5)

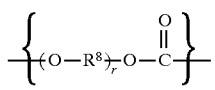

wherein $R^8$ is an alkylene group having 2 to 4 carbon atoms, and r is an integer of 20 to 3,000.

In the above formula (5), the alkylene group having 2 to 4 carbon atoms may have a straight chain or a branched chain, and may be selected from, for example, ethylene, 1,2-propylene, trimethylene and tetramethylene groups.

In the recurring units represented by the formula (4), $R^4$ and $R^5$ are each preferably a methyl group and p and q are each preferably 0 (zero).

The polycarbonate preferably has a viscosity-average molecular weight of 15,000 to 40,000. Such a polycarbonate may be produced by any of interfacial polycondensation, melt polymerization, solution polymerization, etc.

The polyethylene terephthalate is preferably a polyester whose main recurring units are ethylene terephthalate, more preferably a polyester wherein ethylene terephthalate accounts for 70 to 100 mole % of the total recurring units.

The polyethylene terephthalate preferably has an intrinsic viscosity of 0.3 to 1.5 dl/g as measured at 35° C. in o-chlorophenol.

The polyethylene naphthalenedicarboxylate is preferably a polyester whose main recurring units are ethylene 2,6-naphthalenedicarboxylate, more preferably a polyester wherein ethylene 2,6-naphthalenedicarboxylate accounts for 70 to 100 mole % of the total recurring units.

The polyethylene naphthalenedicarboxylate preferably has an intrinsic viscosity of 0.3 to 1.5 dl/g as measured at 35° C. in o-chlorophenol.

The polyvinyl chloride is preferably a flexible PVC.

The polystyrene, the poly(acrylonitrile/styrene) resin and the poly(acrylonitrile/styrene/butadiene) resin are each preferably one containing styrene units in an amount of 50 mole % or more of the total recurring units. It should be understood that the polystyrene, the AS resin and the ABS resin include those wherein part of the styrene units and/or the acrylonitrile units are replaced by a polymer unit of α-methylstyrene, p-methylstyrene, p-tert-butylstyrene, (meth)acrylic acid or a methyl, ethyl, propyl, n-butyl or other alkyl ester thereof, an unsaturated dicarboxylic acid, an unsaturated dicarboxylic acid anhydride, a maleimide compound (e.g. maleimide, N-methylmaleimide or N-phenylmaleimide), or a vinyl compound. (e.g. acrylamide) copolymerizable with styrene.

The thermoplastic resin (A) has a refractive index of preferably 1.54 to 1.60, more preferably 1.55 to 1.60.

The thermoplastic resin (A) has a haze of preferably 30% or less, more preferably 20% or less.

The polyether ester (B) used in the present invention is composed mainly of:

(B1) an aromatic dicarboxylic acid component not having sulfonic acid salt group, (B2) at least one compound component having a sulfonic acid salt group, selected from the group consisting of a compound represented by the formula (1) and a compound represented by the formula (2), (B3) a glycol component having 2 to 10 carbon atoms, and (B4) at least one polyalkylene oxide component having a number-average molecular weight of 200 to 50,000, selected from the group consisting of a poly(alkylene oxide) glycol component, a poly(alkylene oxide) glycol bis(carboxymethyl) ether component and a polyoxyalkylene glycol mono-2,3-dihydroxypropyl ether component.

In the aromatic dicarboxylic acid component (B1) not having sulfonic acid salt group, preferable examples of the aromatic dicarboxylic acid are naphthalenedicarboxylic acid and biphenyldicarboxylic acid.

Preferable examples of the naphthalenedicarboxylic acid are 2,6-naphthalenedicarboxylic acid, 2,7-naphthalenedicarboxylic acid and alkyl- or halogen-substituted derivatives thereof. These compounds can be used singly or in combination of two or more.

Preferable examples of the biphenyldicarboxylic acid are 4,4'-biphenyldicarboxylic acid, 3,3'-biphenyldicarboxylic acid, 2,4'-biphenyldicarboxylic acid and alkyl- or halogen-substituted derivatives thereof.

The aromatic dicarboxylic acid of the aromatic dicarboxylic acid component (B1) can be at least one of the above-mentioned naphthalenedicarboxylic acids and biphenyldicarboxylic acids, or can be a combination of at least one of them and 20 mole % or less of other aromatic dicarboxylic acid such as terephthalic acid or isophthalic acid.

In the formula (1) representing the aromatic dicarboxylic acid compound component (B2) having a sulfonic acid salt group, Ar is an trivalent aromatic group having 6 to 20 carbon atoms, and M⁺ is a metal ion, a tetraalkylphosphonium ion or a tetraalkylammonium ion.

Preferable examples of the trivalent aromatic group (Ar) having 6 to 20 carbon atoms are a benzene ring, a naphthalene ring, a biphenyl ring, and alkyl-, phenyl-, halogen- or alkoxy-substituted derivatives thereof, all being trivalent.

Preferable examples of the metal ion are an alkali metal (e.g. sodium, potassium or lithium) ion, one equivalent of alkaline earth metal ion (e.g. one equivalent of calcium or magnesium ion), and one equivalent of zinc ion.

Preferable examples of the tetraalkylphosphonium ion are tetrabutylphosphonium ion and tetramethylphosphonium ion. Preferable examples of the tetraalkylammonium ion are tetrabutylammonium ion and tetramethylammonium ion.

Among them, the M⁺ is preferably a metal ion, and more preferably an alkali metal ion or zinc ion.

Specific examples of the aromatic dicarboxylic acid having a sulfonic acid salt group are 4-(sodium sulfo)-isophthalic acid, 5-(sodium sulfo)-isophthalic acid, 4-(potassium sulfo)-isophthalic acid, 5-(potassium sulfo)-isophthalic acid, 2-(sodium sulfo)-terephthalic acid, 2-(potassium sulfo)-terephthalic acid, 4-(zinc sulfo)-isophthalic acid, 5-(zinc sulfo)-isophthalic acid, 2-(zinc sulfo)-terephthalic acid, 4-(tetraalkylphosphonium sulfo)-isophthalic acid, 5-(tetraalkylphosphonium sulfo)-isophthalic acid, 4-(tetraalkylammonlum sulfo)-isophthalic acid, 5-(tetraalkylammonium sulfo)-isophthalic acid, 2-(tetraalkylphosphonium sulfo)-terephthalic acid, 2-(tetraalkylammonium sulfo)-terephthalic acid, 4-(sodium sulfo)-2,6-naphthalenedicarboxylic acid, 4-(sodium sulfo)-2,7-naphthalenedicarboxylic acid, 4-(potassium sulfo)-2,6-naphthalenedicarboxylic acid, 4-(potassium sulfo)-2,7-naphthalenedicarboxylic acid, 4-(zinc sulfo)-2,6-naphthalenedicarboxylic acid and 4-(zinc sulfo)-2,7-naphthalene-dicarboxylic acid.

Of these, particularly preferable is a compound of the formula (1) in which the Ar has no substituent and the M⁺ is an alkali metal ion such as sodium ion, potassium ion or the like, because the compound is highly polymerizable and can provide a thermoplastic resin composition of the present invention superior in antistatic property, mechanical properties, color tone, etc.

In another formula (2) representing the glycol compound component (B2) having a sulfonic acid salt group, $Ar^1$ is a trivalent aromatic group having 6 to 20 carbon atoms; M⁺ is a metal ion, a tetraalkylphosphonium ion or a tetraalkylammonium ion; $R^1$ and $R^2$ are each independently a bivalent alkylene group having 2 to 4 carbon atoms; and m and n are each independently an integer of 1 to 20.

Examples and preferable examples of the trivalent aromatic group having 6 to 20 carbon atoms, the metal ion, the tetraalkylphosphonium ion and the tetraalkylammonium ion may be selected from the same as mentioned with respect to the formula (1).

Examples of the alkylene group having 2 to 4 carbon atoms include ethylene, 1,2-propylene, trimethylene and tetramethylene with ethylene and 1,2-propylene being preferred.

n and m are each independently an integer of 1 to 20, preferably 1 to 10, more preferably 1 to 5, particularly preferably 1 to 3.

Specific examples of the glycol compound component represented by the formula (2) are as follows.

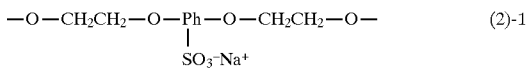
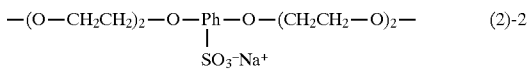
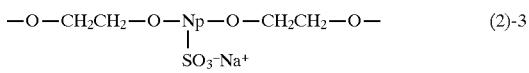
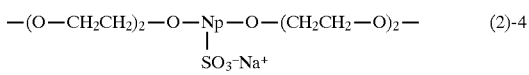
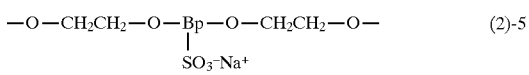
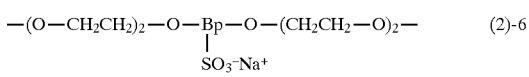
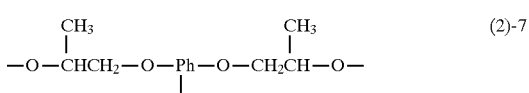
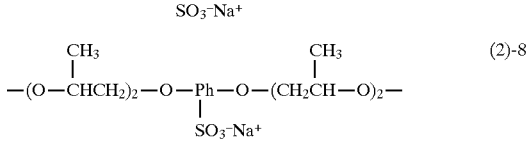
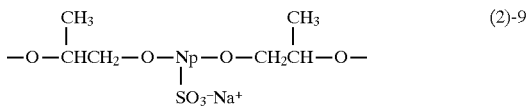
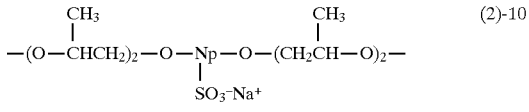
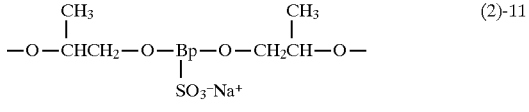
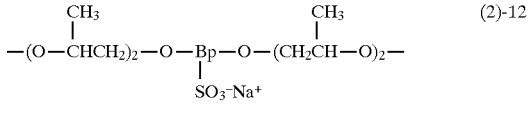
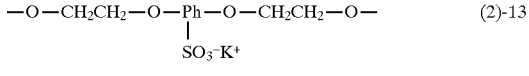
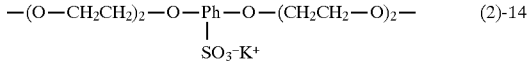
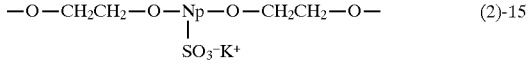
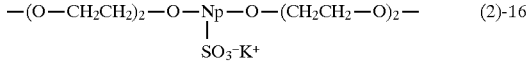
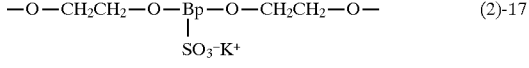
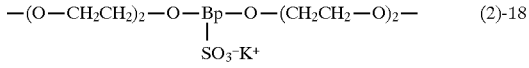

-continued $$-O-\underset{\underset{SO_3^-K^+}{|}}{\overset{\overset{CH_3}{|}}{C}HCH_2}-O-Ph-O-CH_2\overset{\overset{CH_3}{|}}{C}H-O- \quad (2)\text{-}19$$

$$-(O-\underset{\underset{SO_3^-K^+}{|}}{\overset{\overset{CH_3}{|}}{C}HCH_2})_2-O-Ph-O-(CH_2\overset{\overset{CH_3}{|}}{C}H-O)_2- \quad (2)\text{-}20$$

$$-O-\underset{\underset{SO_3^-K^+}{|}}{\overset{\overset{CH_3}{|}}{C}HCH_2}-O-Np-O-CH_2\overset{\overset{CH_3}{|}}{C}H-O- \quad (2)\text{-}21$$

$$-(O-\underset{\underset{SO_3^-K^+}{|}}{\overset{\overset{CH_3}{|}}{C}HCH_2})_2-O-Np-O-(CH_2\overset{\overset{CH_3}{|}}{C}H-O)_2- \quad (2)\text{-}22$$

$$-O-\underset{\underset{SO_3^-K^+}{|}}{\overset{\overset{CH_3}{|}}{C}HCH_2}-O-Bp-O-CH_2\overset{\overset{CH_3}{|}}{C}H-O- \quad (2)\text{-}23$$

$$-(O-\underset{\underset{SO_3^-K^+}{|}}{\overset{\overset{CH_3}{|}}{C}HCH_2})_2-O-Bp-O-(CH_2\overset{\overset{CH_3}{|}}{C}H-O)_2- \quad (2)\text{-}24$$

In the formulas (2)-1 to (2)-24, Ph represents a benzene ring; Np, a naphthalene ring; and Bp, a biphenyl ring.

Of the compounds of the formulas (2)-1 to (2)-24, the compounds of the formulas (2)-1, (2)-3, (2)-5, (2)-13, (2)-15 and (2)-17 are preferable with the compounds of the formulas (2)-1 and (2)-13 being particularly preferable.

The glycol component (B3) having 2 to 10 carbon atoms, constituting the polyether ester (B) includes, for example, glycols having straight chain or branched chain such as ethylene glycol, 1,4-butanediol, propylene glycol, 1,6-hexanediol and 3-methyl-1,5-pentanediol; and glycols whose chain is interrupted with an oxygen atom or a nitrogen atom, such as diethylene glycol and thiodiethanol.

The glycols may be used singly or in combination of two or more. Of them, 1,6-hexanediol or diethylene glycol is preferred because the resulting polyether ester can improve antistatic properties of a thermoplastic resin composition of the present invention superior.

The polyalkylene oxide component (B4) constituting the polyether ester (B) has a number-average molecular weight of 200 to 50,000 and is selected from a poly(alkylene oxide) glycol component, a poly(alkylene oxide glycol) bis (carboxymethyl) ether component and a polyoxyalkylene glycol mono-2,3-dihydroxypropyl ether component. They can be used singly or in combination of two or more kinds.

The poly(alkylene oxide) glycol is preferably, for example, a poly($C_{2-4}$ alkylene oxide) glycol. A poly (ethylene oxide) glycol or a copoly(ethylene oxide/propylene oxide) glycol is particularly preferred.

The poly(alkylene oxide glycol) bis(carboxymethyl) ether is preferably, for example, a compound represented by the following formula (6)

$$HOOCCH_2-O-(R^9-O)_s-CH_2COOH \quad (6)$$

wherein $R^9$ is an alkylene group having 2 to 4 carbon atoms, and s is such a number that the molecular weight of the formula (6) compound becomes 200 to 50,000. Particularly preferred is a compound of the formula (6) wherein $R^9$ is an ethylene group or a combination of an ethylene group and a propylene group.

The polyoxyalkylene glycol mono-2,3-dihydroxypropyl ether is preferably a compound represented by the following formula (7)

$$HO-CH_2\underset{\underset{CH_2O-(R^{10}-O)_t-R^{11}}{|}}{C}H-OH \quad (7)$$

wherein $R^{10}$ is an alkylene group having 2 to 4 carbon atoms; $R^{11}$ is a hydrocarbon group having 1 to 12 carbon atoms; and t is such a number that the molecular weight of the formula (7) compound becomes 200 to 50,000.

The hydrocarbon group having 1 to 12 carbon atoms, represented by $R^{11}$, includes, for example, methyl, ethyl, propyl, butyl, phenyl, and alkyl-, phenyl-, halogen- or alkoxy-substituted phenyl.

Specific examples of the polyoxyalkylene glycol mono-2,3-dihydroxypropyl ether are polyoxyethylene glycol monomethyl mono-2,3-dihydroxypropyl ether, polyoxyethylene glycol monoethyl mono-2,3-dihydroxypropyl ether, polyoxyethylene glycol monoisopropyl mono-2,3-dihydroxypropyl ether, polyoxyethylene glycol monocetyl mono-2,3-dihydroxypropyl ether, polyoxyethylene glycol monophenyl mono-2,3-dihydroxypropyl ether, polyoxyethylene glycol mono-4-biphenyl mono-2,3-dihydroxypropyl ether, polyoxypropylene glycol monomethyl mono-2,3-dihydroxypropyl ether, polyoxypropylene glycol mono-4-biphenyl mono-2,3-dihydroxypropyl ether, and monomethyl mono-2,3-dihydroxypropyl ether of polyoxyethylene glycol/polyoxypropylene glycol copolymer.

Of these, preferred are polyoxyethylene glycol monomethyl mono-2,3-dihydroxypropyl ether and polyoxyethylene glycol monophenyl mono-2,3-dihydroxypropyl ether.

Of the above compounds, particularly preferable as the polyalkylene oxide component (B4) are those compounds in which the alkylene oxide moiety is ethylene oxide.

The above-mentioned compounds as the polyalkylene oxide component (B4) can be used singly or in combination of two or more kinds. The polyalkylene oxide component (B4) has a number-average molecular weight of 200 to 50,000, preferably 500 to 30,000, more preferably 1,000 to 20,000.

The polyalkylene oxide component (B4) is contained in the polyether ester (B) in an amount of preferably 10 to 40% by weight, more preferably 12 to 35% by weight, particularly preferably 15 to 35% by weight. When the amount is smaller than 10% by weight, the resulting thermoplastic resin composition tends to have a low antistatic effect; and when the amount is larger than 40% by weight, the resulting polyether ester has a reduced refractive index, making it difficult to obtain a thermoplastic resin composition having a high light transmittance and excellent transparency.

The polyether ester (B) is substantially immiscible with the thermoplastic resin (A). That is, they do not mix with each other in the level of molecules; in the thermoplastic resin composition of the present invention, the polyether ester (B) forms discrete phases of continuous streaks or layers in the thermoplastic resin (A).

In the present invention, the polyether ester (B) can be a copolymer composed of the aromatic dicarboxylic acid component (B1), the compound component (B2) having a sulfonic acid salt group, the glycol component (B3) having 2 to 10 carbon atoms and the polyalkylene oxide component (B4) as the copolymer units; or, can be a combination of a copolymer composed, as the polymer unites, of the aromatic dicarboxylic acid component (B1), the compound component (B2) having a sulfonic acid salt group, and the glycol component (B3) having 2 to 10 carbon atoms and a copolymer composed, as the polymer units, of the aromatic dicarboxylic acid component (B1), the glycol component (B3) having 2 to 10 carbon atoms and the polyalkylene oxide component (B4).

The polyether ester (B) is contained in the thermoplastic resin composition of the invention in an amount of 5 to 40 parts by weight per 100 parts by weight of the thermoplastic resin (A).

When the amount of the polyether ester (B) is smaller than 5 parts by weight, the resulting thermoplastic resin composition has an insufficient antistatic effect. When the amount is larger than 40 parts by weight, the resulting composition has greatly deteriorated properties. The amount of the polyether ester (B) is preferably 5 to 30 parts by weight, more preferably 7 to 25 parts by weight, particularly preferably 10 to 20 parts by weight.

The polyether ester (B) has a reduced viscosity of preferably 0.3 or more as measured at a concentration of 1.2 g/dl at 35° C. in a phenol/tetrachloroethane (60/40 by weight ratio) mixed solvent. When the reduced viscosity is smaller than 0.3, the resulting thermoplastic resin composition has reduced heat resistance and physical properties. The polyether ester (B) has no upper limit for the reduced viscosity, because the polymer is substantially linear and its reduced viscosity is preferred to be as high as possible in view of the antistatic effect and the physical properties. However, the upper limit of the reduced viscosity is about 4.0 in practical polymerization. The reduced viscosity is more preferably 0.4 or more, particularly preferably 0.5 or more.

The polyether ester (B) can be obtained by melting the compounds which afford the components (B1), (B3) and (B2) and/or (B4) in the presence of an ester exchange catalyst at 150° to 300° C. under an atmospheric or reduced pressure to polycondense compounds.

The ester exchange catalyst can be any catalyst which can be used in an ordinary ester exchange reaction. The ester exchange catalyst can be exemplified by antimony compounds such as antimony trioxide and the like; tin compounds such as stannous acetate, dibutyltin oxide, dibutyltin diacetate and the like; titanium compounds such as tetrabutyl titanate and the like; zinc compounds such as zinc acetate and the like; calcium compounds such as calcium acetate and the like; and alkali metal salts such as sodium carbonate, potassium carbonate and the like. Of these, tetrabutyl titanate is preferred.

The amount of the ester exchange catalyst may be an amount used in an ordinary ester exchange reaction, and is preferably 0.01 to 0.5 mole %, more preferably 0.03 to 0.3 mole % per mole of the acid components used.

In the polycondensation reaction, it is also preferable to use various stabilizers such as antioxidant and the like.

In melting the compounds which afford the components (B1), (B3) and (B2) and/or (B4) to conduct the polycondensation, an esterification reaction and/or an ester exchange reaction are carried out as an initial reaction at 150° to 200° C. for several tens of minutes to several tens of hours while volatile substances being distilled off; and thereafter, the reaction product is subjected to a polycondensation reaction at 180° to 300° C. When the reaction temperature is lower than 180° C., the reaction does not proceed sufficiently, while when the temperature is higher than 300° C., side reactions such as decomposition and the like are liable to take place. The polymerization temperature is preferably 200° to 280° C., more preferably 220° to 250° C. The time of the polymerization reaction varies depending upon the reaction temperature and the catalyst amount, and is generally about several tens of minutes to about several tens of hours.

The thermoplastic resin composition of the present invention comprises the above-mentioned thermoplastic resin (A) having a refractive index of 1.52 to 1.61 and the above-mentioned polyether ester (B). In the present composition, the difference in refractive index between the two compounds (A) and (B) must be 0.04 or less. This difference in refractive index of 0.04 or less preferably is held over the entire visible light range, but practically suffices if it is held at least at the D ray (wavelength: 589 nm) of Fraunhofer lines. When the difference in refractive index is larger than 0.04, the resin composition tends to cause light scattering at the interfaces between the thermoplastic resin and the discrete phases of the polyether ester, resulting in occurrence of turbidity and reduction in transparency.

The thermoplastic resin composition of the invention is superior in transparency and therefore has a haze of 40 % or less, preferably 30 % or less, more preferably 20 % or less.

The thermoplastic resin composition of the invention is superior in antistatic property as well and has a surface resistivity of $1\times10^{10}$ to $1\times10^{14}$ ohm/square.

The thermoplastic resin composition of the invention preferably comprises an ionic surfactant (C) further.

It is generally known to add a surfactant to a resin to endow the resin with an antistatic effect. In this technique, however, the antistatic effect is reduced by water washing or wiping. In the thermoplastic resin composition containing the polyether ester (B) according to the invention, however, the addition of the ionic surfactant (C) gives an increased antistatic effect to the composition and, surprisingly, the antistatic effect is not impaired by water washing or wiping.

The ionic surfactant (C) is preferably an anionic surfactant, and a sulfonic acid salt such as alkylsulfonic acid salt, alkylbenzenesulfonic acid salt or alkylnaphthalenesulfonic acid salt is particularly preferred.

As the ionic surfactant (C), there is particularly preferred, for example, a compound represented by the following formula (3)

  (3)

[wherein $Ar^2$ is a (l+1)-valent aromatic group having 6 to 20 carbon atoms; $M^+$ is a metal ion, a tetraalkyldhosphonium ion or a tetraalkylammonium ion; $R^3$ is an alkyl group having 1 to 20 carbon atoms; and l is an integer of 1 to 5].

In the formula (3), $Ar^2$ is a (l+1)-valent aromatic group having 6 to 20 carbon atoms and includes, for example, a benzene ring, a naphthalene ring, a biphenyl ring and the like. $M^+$ is a metal ion, a tetraalkylphosphonium ion or a tetraalkylammonium ion. Examples of these ions can be the same as mentioned with respect to the formula (1). $R^3$ is an alkyl group having 1 to 20 carbon atoms and can have a straight chain or a branched chain. Examples thereof can be methyl, ethyl, isopropyl, octyl, decyl, dodecyl and cetyl.

The sulfonic acid salt used as the ionic surfactant (C) can be selected from alkylsulfonic acid salts such as sodium dodecylsulfonate, potassium dodecylsulfonate, sodium decylsulfonate, potassium decylsulfonate, sodium cetylsulfonate, potassium cetylsulfonate and the like; alkylbenzenesulfonic acid salts such as sodium dodecylbenzenesulfonate, potassium dodecylbenzenesulfonate, sodium decylbenzenesulfonate, potassium decylbenzenesulfonate, sodium cetylbenzenesulfonate, potassium cetylbenzenesulfonate and the like; and alkylnaphthalenesulfonic acid salts such as sodium mono-, di- or tri-(isopropyl)naphthalenesulfonate, potassium mono-, di- or tri-(isopropyl)naphthalenesulfonate, sodium mono-, di- or tri-(octyl)

naphthalenesulfonate, potassium mono-, di- or tri-(octyl) naphthalenesulfonate, sodium (dodecyl) naphthalenesulfonate, potassium mono-, di- or tri-(dodecyl) naphthalenesulfonate and the like.

The above ionic surfactants can be used singly or in combination of two or more.

The amount of the ionic surfactant (C) used is preferably 0.5 to 10 parts by weight per 100 parts by weight of the thermoplastic resin (A) and 5 to 40 parts by weight of the polyether ester (B), and is preferably 10 to 30% by weight based on the compound (B). When the amount of the ionic surfactant (C) is smaller than 0.5 part by weight, sufficient antistatic effect due to the addition of the ionic surfactant (C) might not be exhibited. When the amount is larger than 10 parts by weight, the resulting thermoplastic resin composition has reduced physical properties or handleability. The amount of the ionic surfactant (C) used is more preferably 1 to 6 parts by weight.

In the thermoplastic resin composition of the present invention containing the ionic surfactant (C), the ionic surfactant (C) has higher affinity to the polyether ester (B) than to the thermoplastic resin (A); therefore, the difference in refractive index between the thermoplastic resin (A) and the polyether ester (B) appears as a difference in refractive index between the thermoplastic resin (A) and a mixture of the polyether ester (B) and the ionic surfactant (C). Consequently, in the present thermoplastic resin composition containing the ionic surfactant (C), the difference in refractive index between the thermoplastic resin (A) and the mixture of the polyether ester (B) and the ionic surfactant (C) is 0.04 or less.

The thermoplastic resin composition of the present invention can be produced by melt-kneading the thermoplastic resin (A), the polyether ester (B) and, as necessary, various additives, or these components and the ionic surfactant (C), by a method known per se.

In producing the present composition not containing the compound (C), the compounds- (A) and (B) can be kneaded with each other directly. On the other hand, in producing the present composition containing the compounds (A), (B) and (C), these compounds can be mixed in various orders, for example, by mixing the three compounds simultaneously or by premixing two compounds and then adding the remaining compounds. These mixing can be conducted by a method known per se. Preferably, the three compounds are mixed simultaneously, or the compounds (B) and (C) are premixed and then the compound (A) is added. The latter approach requiring two mixing steps is more preferred in view of the antistatic effect and handleability.

When all the compounds are mixed simultaneously, the compounds (A) and (B) or the compounds (A), (B) and (C) are kneaded together with various additives, described above, used as necessary, with a single-screw or twin-screw melt extruder.

The temperature of melt kneading depends upon the melting temperature of the thermoplastic resin (A). For example, when the thermoplastic resin (A) is a polycarbonate, the melt kneading temperature is preferably about 250° to 320° C.; and when the component (A) is a polystyrene, the melt kneading temperature is appropriately about 180° to 260° C.

When two compounds are premixed and then the remaining compound is added, it is preferable to premix the compounds (B) and (C) and then add the compound (A) and various additives used optionally, because the resulting composition can have high antistatic effect and good handleability in molding.

Melt kneading of the polyether ester (B) and the ionic surfactant (C) can be conducted, for example, by a method in which a polyether ester is produced by a polymerization in a reactor and then an ionic surfactant is added directly to the reactor, followed by kneading, or by a method in which a polyether ester and an ionic surfactant are kneaded together with a single-screw or twin-screw melt extruder. The temperature of melt kneading is generally 140° to 300° C. When the temperature is lower than 140° C., mixing may be insufficient. When the temperature is higher than 300° C., there may occur degradation such as decomposition or the like. The melt kneading temperature is preferably 160° to 270° C., more preferably 200° to 250° C.

As mentioned above, the thermoplastic resin composition of the present invention can comprise various additives as necessary.

Such additives include, for example, fibrous reinforcing agents such as glass fiber, metal fiber, aramid fiber, ceramic fiber, potassium titanate whiskers, carbon fiber, asbestos and the like; various fillers such as talc, calcium carbonate, mica, clay, titanium oxide, aluminum oxide, glass flakes, milled fiber, metal flakes, metal powder and the like; thermal stabilizers or catalyst deactivators typified by phosphoric acid ester and phosphorous acid ester; oxidation stabilizers such as hindered phenols; light stabilizers; lubricants; pigments; flame retardants; auxiliary flame retardants containing halogen or phosphorus; and plasticizers.

In preferred embodiments of the thermoplastic resin composition of the invention, the thermoplastic resin (A) is a polycarbonate or a polystyrene.

When the thermoplastic resin (A) is a polycarbonate, one preferred embodiment of the thermoplastic resin composition of the invention is a composition comprising the compounds (A), (B) and (C), wherein the thermoplastic resin as the compound (A) is a polycarbonate resin having a refractive index of 1.56 to 1.60, the polyether ester as the compound (B) is composed mainly of:

a naphthalenedicarboxylic acid component, at least one compound component having a sulfonic acid salt group, selected from the group consisting of a compound represented by the formula (1) and a compound represented by the formula (2), a hexamethylene glycol component or a combination of hexamethylene glycol and ethylene glycol, and a polyethylene oxide component having a number-average molecular weight of 200 to 50,000, and the ionic surfactant as the compound (C) is a compound represented by the formula (3) in which Ar2 is a naphthalene ring or a biphenyl ring.

In the above case, the difference in refractive index between the polycarbonate resin (A) and the mixture of the polyether ester (B) and the ionic surfactant (C) is 0.04 or less As the polyether ester (B) of the above preferred embodiment of the present composition, it is more preferable to use a polyether ester in which the amount of the compound component having a sulfonic acid salt group is 5 to 50 mole % based on the naphthalenedicarboxylic acid component and the amount of the polyethylene oxide component is 10 to 40% by weight based on the total of the naphthalenedicarboxylic acid component, the compound component having a sulfonic acid salt group, the hexamethylene glycol component or the combination of hexamethylene glycol and ethylene glycol and the polyethylene oxide component.

The above preferred thermoplastic resin composition of the present invention, in which the thermoplastic resin (A) is a polycarbonate, preferably has a haze of 20% or less.

When the thermoplastic resin (A) is a polystyrene, one preferred embodiment of the thermoplastic resin composition of the invention is a composition comprising the compounds (A), (B) and (C), wherein the thermoplastic resin as the compound (A) is a polystyrene having a refractive index of 1.57 to 1.60, the polyether ester as the compound (B) is composed mainly of a naphthalenedicarboxylic acid component, at least one compound component having a sulfonic acid salt group, selected from the group consisting of a compound represented by the formula (1) and a compound represented by the formula (2), a hexamethylene glycol component or a combination of hexamethylene glycol and ethylene glycol, and a polyethylene oxide component having a number-average molecular weight of 200 to 50,000, and the ionic surfactant as the compound (C) is a compound represented by the formula (3) in which $Ar^2$ is a naphthalene ring or a biphenyl ring.

In the above case, the difference in refractive index between the polystyrene (A) and the mixture of the polyether ester (B) and the ionic surfactant (C) is 0.04 or less.

As the polyether ester (B) of the above preferred embodiment of the present composition, it is more preferable to use a polyether ester in which the amount of the compound component having a sulfonic acid salt group is 5 to 50 mole % based on the naphthalenedicarboxylic acid component and the amount of the polyethylene oxide component is 10 to 40% by weight based on the total of the naphthalenedicarboxylic acid component, the compound component having a sulfonic acid salt group, the hexamethylene glycol component or the combination of hexamethylene glycol and ethylene glycol and the polyethylene oxide component.

The polyether ester (B) used in the present invention is very unique in that when kneaded with the thermoplastic resin (A) having a refractive index of 1.52 to 1.61, it gives a thermoplastic resin composition superior in antistatic properties, while retaining transparency.

Therefore, according to the present invention, there is also provided use of a composition comprising a polyether ester having excellent properties as described above and an ionic surfactant (C), for producing a thermoplastic resin composition having transparency and antistatic properties by mixing the composition with a thermoplastic resin having a refractive index of 1.52 to 1.61 and a haze of 40% or less.

The thermoplastic resin composition of the present invention is subjected to thermal forming (e.g. injection extrusion) by an ordinary method, whereby it can be made into various shaped articles, sheets, films and the like, which are superior in transparency and antistatic properties.

Examples of the shaped articles include housings, vessels, mask pipes, water pipes, window frames, sound insulating walls, building materials, optical parts such as lens, parts for medical equipment and the like.

[EXAMPLES]

The preferred embodiments of the present invention are hereinafter described by way of Examples. However, the present invention is not restricted to these Examples alone.

In the Examples, "parts" refer to "parts by weight".

<Reduced viscosity>

Unless otherwise specified, it was measured at a concentration of 1.2 g/dl at 35° C. in a phenol/tetrachloroethyane (60/40 by weight ratio) mixed solvent.

<Sodium isopropylnaphthalenesulfonate>In the sodium isopropylnaphthalenesulfonate used in Reference Examples (production of polyether esters), the naphthalene ring had two to three isopropyl groups as substituents.

<Refractive index>

It was measured by the use of an Abbe refractometer manufactured by Atago K.K.

<Impact strength>

It was measured at ⅛ in. in accordance with ASTM D 256.

<Heat distortion temperature (HDT)>

It was measured at ⅛ in. under a load of 18.6 kg/cm² in accordane with ASTM D 648.

<Surface resistivity (R)>

A test piece (a shaped article) was allowed to stand for 24 hours in an atmosphere of 20° C. and 60% humidity and then measured for surface resistivity before washing at an applied voltage of 1,000 V with a Super Insulation Tester (SM-8210, manufactured by Toa Denpa Kogyo KK.). Then, the test piece was washed by running water of 30° C. for 2 hours, and the water remaining on the test piece was wiped off with a clear paper. Thereafter, the test piece was dried under the same conditions as above and measured for surface resistivity after water washing. Each of the test results was expressed in log R [R is a surface resistivity (ohm/square)].

<Total light transmittance and haze of shaped article>

Light transmittance (%) was measured in accordance with ASTM D 1003. The measurement was conducted using a Haze, Transmittance and Reflectometer HR-100, manufactured by Murakami Color Research Laboratory, and a sample thickness was 2 mm and CIE Source C was used.

Referential Example 1

A reactor equipped with a rectifying column and a stirrer were charged with 1,074 parts of dimethyl 2,6-naphthalanedicarboxylate, 381 parts of dimethyl (4-sodium sulfo)-2,6-naphthalenedicarboxylate, 910 parts of 1,6-hexamethylene glycol, 750 parts (30% by weight of total polymer formed) of a poly(ethylene oxide) glycol having a number-average molecular weight of 2,000 and 1.3 parts of tetrabutyl titanate. The inside of the reactor was purged with nitrogen and heated to 220° C. at normal pressure. At that temperature, a reaction was conducted for 5 hours while methanol was being distilled off. The reaction mixture was transferred into a reactor equipped with a stirrer and a vacuum distillation system, and heated to 240° C. in 45 minutes. At the temperature of 240° C., then, the inside pressure of the reaction system was gradually reduced to 0.2 mmHg in 60 minutes to obtain a polymer after 150 minutes. The obtained polyether ester had a reduced viscosity of 1.16. Thereto was added 500 parts of sodium isopropylnaphthalenesulfonate and after reactor inside was purged with nitrogen, a mixture was stirred at 240° C. for 1 hour under a reduced pressure. The mixture is designated as E1. The mixture E1 had a refractive index of 1.577.

Referetial Examples 2–4

The reaction was conducted in the same manner as in Example 1 except that compounds shown in Table 1 were used in amounts shown in Table 1, whereby various polyether esters were obtained. The results and the ionic surfactants (C) added are shown in Table 1.

Referential Example 5

The reaction was conducted in the same manner as in Example 1, except that compounds shown in Table 1 were used in amounts shown in Table 1, whereby two kinds of polyether esters were obtained. In these two polymers, the content of the compound component (B2) containing a sulfonic acid salt group is 14 mole % and the content of the poly(alkyleneoxide) component (B4) is 28 mole % by weight based on the naphthalene dicarboxilic acid component (B1). These two polymers and sodium isopropylnaphthalenesulfonate were used in respective amounts shown in Table 1, and were melt-kneaded under the conditions of a polymer temperature of 200° C. and an average residence time of about 5 minutes, using a 30 mmφ co-rotating twin extruder (PCM 30, manufactured by Ikegai Corp.) to obtain a mixture E5 as pellets. The results are shown in Table 1.

Referential Example 6

Five hundred and twenty (520) parts by weight of the same polyether ester as obtained in Reference Example 2 and the amount shown in Table 1 of sodium isopropylnaphthalenesulfonate were melt-kneaded together under the conditions of a polymer temperature of 200° C. and an average residence time of about 5 minutes, using a 30 mmφ co-rotating twin extruder (PCM 30, manufactured by Ikegai Corp.), and were formed into pellets. The obtained mixture was designated as a mixture E2. The results are shown in Table 1.

Referential Examples 7 to 9

The reaction was conducted in the same manner as in Example 1 except that compounds shown in Table 1 were used in amounts shown in Table 1, whereby various polyether esters were obtained. The results are shown in Table 1.

TABLE 1

| | (B) Polyether ester | | | | |
|---|---|---|---|---|---|
| Referential Examples | (B1) Aromatic dicarboxylic acid component having not sulfonic acid salt group | (B2) Compound component having a sulfonic acid salt group [Each figure in <> indicates a proportion of (B2) to (B1)] | (B3) Glycol component | (B4) Poly(alkylene oxide) component [Each figure in <> indicates wt. % based on total polymers] | Reduced viscosity | Amounts of two polyether esters mixed (parts by weight) |
| 1 | QA(1074) | S-QE(381) <25 mole %> | C6(910) | PEG(750) <30> | 1.16 | — |
| 2 | QA(1288) | S-IA(213) <14 mole %> | 96(637) + C2(409) | PEG(768) <30> | 1.51 | — |
| 3 | BA(1188) | S-IA(326) <25 mole %> | C6(584) + C2(375) | PEG(763) <30> | 1.00 | — |
| 4 | QA(1074) | S-IA(326) <25 mole %> | C6(910) | PEG(727) <30> | 1.11 | — |
| 5 | QA(1288) | S-IA(426) | C6(1189) | — | 0.43 | 250 |
| | QA(902) | — | C6(654) | PEG(1075) | 0.99 | 340 |
| 6 | QA(1288) | S-IA(213) <14 mole %> | C6(637) + C2(409) | PEG(768) <30> | 1.51 | — |
| 7 | QA(1302) | S-IA(48.8) <3 mole %> | C6(584) + C2(357) | PEG(692) <30> | 1.55 | — |
| 8 | TA(989) | S-IA(266) <18 mole %> | C6(1062) | PEG(677) <30> | 1.23 | — |
| 9 | QA(878) | S-IA(266) <25 mole %> | C6(478) + C2(558) | PEG(1362) <30> | 1.54 | — |

| Referential Examples | (C) Ionic surtactant | Symbol | Mixture of (B) and (C) Refractive index | Corresponding Example [Each figure in <> indicates a thermoplastic resin (A) used] |
|---|---|---|---|---|
| 1 | INS-Na(500) | E1 | 1.577 | 1 <PC> |
| 2 | — | — | — | 4 <PSt> |
| 3 | INS-Na(504) | E3 | 1.576 | 3 <PC> |
| 4 | DBS-Na(485) | E4 | 1.551 | 5 <AS> |
| 5 | INS-Na(120) | E5 | 1.573 | 6 <PC> |
| 6 | INS-Na(85) | E2 | 1.575 | 2 <PC> |
| 7 | INS-Na(462) | E6 | 1.581 | Comparative Example 2 <PC> |
| 8 | DBS-Na(451) | E7 | 1.525 | Comparative Example 3 <PC> |
| 9 | DBS-Na(545) | E8 | 1.539 | Comparative Example 4 <PC> |

Note;
Each figure in () indicates partrs by weight.
QA: Dimethyl 2,6-naphthalene dicarboxylate,
BA: Dimethyl 4,4'-diphenyl dicarboxylate,
TA: Dimethyl terephthalate,
S-QE: Dimethyl 4-(sodium sulfo)-2,6-naphthalene dicarboxylate,
S-IA: Dimethyl 5-(sodium sulfo)-isophthalate,
C6: 1,6-Hexamethylene glycol,
C2: Ethylene glycol,
PEG: Poly(ethylene oxide) glycol(Mn2000),
INS-Na: Sodium isopropylnaphthalenesulfonate,
DBS-Na: Sodium dodecyl benzene sulfonate,
PC: Polycarbonate resin,
PSt: Polystyrene resin,
AS: Poly(acrylonitrile/styrene) resin Examples 1 to 6

A polycarbonate resin (Panlite L1250, a product of Teijin Chemicals, Ltd.; refractive index: 1.585) whose main aromatic diol component was bisphenol A, a polystyrene resin (refractive index: 1.59) or an AS resin (refractive index: 1.56) was melt-kneaded with each of the polyether esters produced in Reference Examples 1 to 6, in the proportions shown in Table 2, by the use of a 30 mmφ co-rotating twin extruder (PCM 30, manufactured by Ikegai Corp.) under the conditions of a polymer temperature of 280° C. and an average residence time of about 5 minutes to obtain pellets. The pellets were subjected to injection molding with an injection molding machine (M-50B, manufactured by Meiki Co., Ltd.) at a cylinder temperature of 270° C. and a mold temperature of 50° C. to obtain shaped articles each of 2 mm in thickness. Each shaped article was measured for surface resistivity and other physical properties. The results are shown in Table 2. The surface resistivity (R) obtained was expressed in a common logarithm (log R).

TABLE 2

|  | Examples | | | | | |
| --- | --- | --- | --- | --- | --- | --- |
|  | 1 | 2 | 3 | 4 | 5 | 6 |
| Polycarbonate resin (parts) | 100 | 100 | 100 | — | — | 100 |
| Polystyrene resin (parts) | — | — | — | 100 | — | — |
| AS resin (parts) | — | — | — | — | 100 | — |
| Mixture E1 (parts) | 13.7 | — | — | — | — | — |
| Mixture E2 (parts) | — | 30.2 | — | — | — | — |
| Mixture E3 (parts) | — | — | 13.7 | — | — | — |
| Polymer of Referential Example 2 (parts) | — | — | — | 11.1 | — | — |
| Mixture E4 (parts) | — | — | — | — | 13.7 | — |
| Mixture E5 (parts) | — | — | — | — | — | 13.7 |
| Surface resistivity (log R (Ω)) | | | | | | |
| Before water-washing | 13.0 | 12.1 | 13.0 | 13.2 | 12.0 | 12.9 |
| After water-washing | 13.0 | 11.9 | 13.0 | 13.1 | 12.2 | 13.0 |
| Total light transmittance % | 87 | 83 | 88 | 85 | 89 | 80 |
| Haze (%) | 8 | 9 | 7 | 21 | 4 | 15 |
| Impact strength (kg · cm/cm) (Izod, notched) | 53 | 53 | 55 | 1 | 1 | 11 |
| Heat distortion temp. (°C.) | 123 | 115 | 123 | 75 | 88 | 125 |

Comparative Example 1

A polycarbonate resin (Panlite L1250, a product of Teijin Chemicals, Ltd.) was subjected to injection molding at a cylinder temperature of 290° C. and a mold temperature of 50° C. to obtain a shaped article having a thickness of 2 mm. The shaped article was evaluated for an antistatic effect in the same way as in the above Examples. Its surface resistivity was also measured. The results are shown in Table 3.

Comparative Examples 2 to 4

The same polycarbonate resin as used in Comparative Example 1 was mixed with the mixture E6, E7 or E8 and then made into respective shaped articles. Each shaped article was evaluated for an antistatic effect in the same way as in the above Examples. The results are shown in Table 3.

TABLE 3

|  | Comparative Examples | | | |
| --- | --- | --- | --- | --- |
|  | 1 | 2 | 3 | 4 |
| Polycarbonate resin (parts) | 100 | 100 | 100 | 100 |
| Mixture E6 (parts) | — | 13.7 | — | — |
| Mixture E7 (parts) | — | — | 13.7 | — |
| Mixture E8 (parts) | — | — | — | 13.7 |
| Surface resistivity (log R (Ω)) | | | | |
| Before water-washing | >16 | 14.0 | 12.5 | 11.8 |
| After water-washing | >16 | 14.2 | 12.8 | 11.8 |
| Total light transmittance (%) | 93 | 86 | 48 | 53 |
| Haze (%) | — | 0.4 | 6 | 88 | 87 |

TABLE 3-continued

|  | Comparative Examples | | | |
| --- | --- | --- | --- | --- |
|  | 1 | 2 | 3 | 4 |
| Impact strength (kg · cm/cm) (Izod, notched) | 75 | 52 | 67 | 64 |
| Heat distortion temp. (°C.) | 131 | 123 | 125 | 124 |

What is claimed is:

1. A thermoplastic resin composition having transparency and antistatic properties, comprising an admixture of:
   100 parts by weight of a thermoplastic resin (A) having a refractive index of 1.52 to 1.61 and a haze of 40 or less, and
   5 to 40 parts by weight of a polyether ester (B) which is substantially immiscible with the thermoplastic resin (A) and which is composed mainly of:
   (B1) an aromatic dicarboxvlic acid component not having sulfonic acid salt group,
   (B2) at least one compound component having a sulfonic acid salt group, selected from the group consisting of a dicarboxvlic acid compound component represented by the following formula (1)

$$-OC-Ar-CO- \atop | \atop SO_3^-M^+ \qquad (1)$$

wherein Ar is a trivalent aromatic group having 6 to 20 carbon atoms, and $M^+$ is a metal ion, a tetraalkylphosphonium ion or a tetraalkylammonium ion
and a glycol compound component represented by the following formula (2)

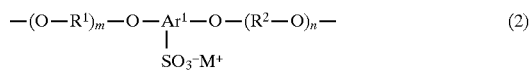

$$-(O-R^1)_m-O-Ar^1-O-(R^2-O)_n- \atop | \atop SO_3^-M^+ \qquad (2)$$

wherein $R^1$ and $R^2$ are each independently a bivalent alkylene group having 2 to 4 carbon atoms; m and n are each independently an integer of 1 to 20; $Ar^1$ is a trivalent aromatic group having 6 to 20 carbon atoms; and $M^+$ is a metal ion, a tetraalkylphosphonium ion or a tetraalkylammonium ion,
   (B3) a glycol component having 2 to 10 carbon atoms, and
   (B4) at least one polyalkylene oxide component having a number-average molecular weight of 200 to 50,000, selected from the group consisting of a poly(alkylene oxide) glycol component, a poly (alkylene oxide) glycol bis(carboxymethyl) ether component and a polyoxyalkylene glycol mono-2,3-dihydroxypropyl ether component, in which thermoplastic resin composition the difference in refractive index between the thermoplastic resin (A) and the polyether ester (B) is 0.04 or less and which thermoplastic resin composition has a haze of 40% or less and a surface resistivity of $1 \times 10^{10}$ to $1 \times 10^{14}$ ohm/square.

2. A thermoplastic resin composition according to claim 1, wherein the thermoplastic resin is selected from the group consisting of a polycarbonate, a polyethylene terephthalate, a polyethylene naphthalenedicarboxylate, a polyvinyl chloride, a polystyrene, a poly(acrylonitrile/styrene), poly (methyl methacrylate/styrene) and a poly(acrylonitrile/styrene/butadiene).

3. A thermoplastic resin composition according to claim 1, wherein the aromatic dicarboxylic acid component not having sulfonic acid salt group, of the polyether ester is naphthalenedicarboxylic acid or biphenyldicarboxylic acid.

4. A thermoplastic resin composition according to claim 1, wherein the compound component having a sulfonic acid salt group, of the polyether ester is a compound of the formula (1) in which Ar is a benzene ring, a naphthalene ring, a biphenyl ring or an alkyl-, phenyl-, alkoxy- or halogen-substituted derivative thereof.

5. A thermoplastic resin composition according to claim 1, wherein the compound component having a sulfonic acid salt group, of the polyether ester is a compound of the formula (2) in which $Ar^1$ is a benzene ring, a naphthalene ring, a biphenyl ring or an alkyl-, phenyl-, alkoxy- or halogen-substituted derivative thereof, and $R^1$ and $R^2$ are each independently an ethylene group or a propylene group.

6. A thermoplastic resin composition according to claim 1, wherein the glycol component having 2 to 10 carbon atoms, of the polyether ester is at least one member selected from the group consisting of ethylene glycol, 1,4-butanediol, propylene glycol, 1,6-hexanediol and 3-methyl-1,5-pentanediol.

7. A thermoplastic resin composition according to claim 1, wherein the alkylene oxide moiety of the polyalkylene oxide component of the polyether ester is ethylene oxide.

8. A thermoplastic resin composition according to claim 1, wherein the polyether ester is a copolymer containing, as the polymeric units, an aromatic dicarboxylic acid component, a compound component having a sulfonic acid salt group, a glycol component having 2 to 10 carbon atoms and a polyalkylene oxide component.

9. An injection-molded article obtained from a thermoplastic resin composition of claim 1.

10. A thermoplastic resin composition according to claim 1, wherein the number-average molecular weight of said at least one polyalkylene oxide component is between 5000 and 30,000.

11. A thermoplastic resin composition having transparency and antistatic properties, comprising an admixture of:
100 parts by weight of a thermoplastic resin (A) having a refractive index of 1.52 to 1.61 and a haze of 40 or less, and
5 to 40 parts by weight of a polyether ester (B) which is substantially immiscible with the thermoplastic resin (A) and which is composed mainly of:
(B1) an aromatic dicarboxylic acid component not having a sulfonic acid salt group,
(B2) at least one compound component having a sulfonic acid salt group, selected from the group consisting of a dicarboxylic acid compound component represented by the following formula (1)

wherein Ar is a trivalent aromatic group having 6 to 20 carbon atoms, and $M^+$ is a metal ion, a tetraalkylphosphonium ion or a tetraalkylammonium ion, and a glycol compound component represented by the following formula (2)

wherein $R^1$ and $R^2$ are each independently a bivalent alkylene group having 2 to 4 carbon atoms; m and n are each independently an integer of 1 to 20; $Ar^1$ is a trivalent aromatic group having 6 to 20 carbon atoms; and $M^+$ is a metal ion, a tetraalkylphosphonium ion or a tetraalkylammonium ion,
(B3) a glycol component having 2 to 10 carbon atoms, and
(B4) at least one polyalkylene oxide component having a number-average molecular weight of 200 to 50,000, selected from the group consisting of a poly(alkylene oxide) glycol component, a poly(alkylene oxide) glycol bis(carboxymethyl ether component and a polyoxyalkylene glycol mono-2,3-dihydroxypropyl ether component and 0.5 to 10 parts by weight of an ionic surfactant (C), in which the difference in refractive index between the thermoplastic resin (A) and the mixture of the polyether ester (B) and the ionic surfactant (C) in the compounded amounts is 0.04 or less and which thermoplastic resin composition has a haze 40% or less and a surface resistivity of $1\times10^{10}$ to $1\times10^{14}$ ohm/□.

12. A thermoplastic resin composition according to claim 11, wherein the polyether ester (B) is a combination of a copolymer containing, as the polymeric units, an aromatic dicarboxylic acid component, a compound component having a sulfonic acid salt group and a glycol component having 2 to 10 carbon atoms, and a copolymer containing, as the polymeric units, an aromatic dicarboxylic acid component, a glycol component having 2 to 10 carbon atoms and a polyalkylene oxide component.

13. A thermoplastic resin composition according to claim 11, wherein the ionic surfactant is an anionic surfactant which is a sulfonic acid salt.

14. A thermoplastic resin composition according to claim 11, wherein the ionic surfactant is a compound represented by the following formula (3)

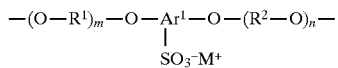

wherein $Ar^2$ is a (l+1)-valent aromatic group having 6 to 20 carbon atoms; $M^+$ is a metal ion, a tetraalkylphosphonium ion or a tetraalkylammonium ion; $R^3$ is an alkyl group having 1 to 20 carbon atoms; and l is an integer of 1 to 5.

15. A thermoplastic resin composition according to claim 11, wherein
the thermoplastic resin is a polycarbonate having a refractive index of 1.56 to 1.60,
the polyether ester is composed mainly of a naphthalenedicarboxylic acid component, at least one compound component having a sulfonic acid salt group, selected from the group consisting of a compound represented by the formula (1) and a compound represented by the formula (2), a hexamethylene glycol component or a mixed component of hexamethylene glycol and ethylene glycol, and a polyethylene oxide component having a number-average molecular weight of 200 to 50,000, and
the ionic surfactant is a compound of the formula (3) in which $Ar^2$ is a naphthalene ring or a biphenyl ring.

16. A thermoplastic resin composition according to claim 15, wherein the amount of the compound component having a sulfonic acid salt group is 5 to 50 mole % based on the naphthalenedicarboxylic acid component and the amount of the polyethylene oxide component is 10 to 40% by weight based on the total of the naphthalenedicarboxylic acid component, the compound component having a sulfonic acid salt group, the hexamethylene glycol component or a combination of hexamethylene glycol and ethylene glycol, and the polyethylene oxide component.

17. A thermoplastic resin composition according to claim 15, which has a haze of 20% or less.

18. A thermoplastic resin composition according to claim 11, wherein
the thermoplastic resin is a polystyrene having a refractive index of 1.57 to 1.60,
the polyether ester is composed mainly of a naphthalenedicarboxylic acid component, at least one compound component having a sulfonic acid salt group, selected from the group consisting of a compound represented by the formula (1) and a compound represented by the formula (2), a hexamethylene glycol component or a mixed component of hexamethylene glycol and ethylene glycol, and a polyethylene oxide component having a number-average molecular weight of 200 to 50,000, and
the ionic surfactant is a compound of the formula (3) in which $Ar^2$ is a naphthalene ring or a biphenyl ring.

19. A thermoplastic resin composition according to claim 18, wherein the amount of the compound component having a sulfonic acid salt group is 5 to 50 mole % based on the naphthalenedicarboxylic acid component and the amount of the polyethylene oxide component is 10 to 40% by weight based on the total of the naphthalenedicarboxylic acid component, the compound component having a sulfonic acid salt group, the hexamethylene glycol component or the mixed component of hexamethylene glycol and ethylene glycol, and the polyethylene oxide component.

20. An injection-molded article obtained from a thermoplastic resin composition of claim 11.

21. A process for producing a thermoplastic polyester resin having transparency and antistatic properties, which comprises mixing:
(A) 100 parts by weight of a thermoplastic resin having a refractive index of 1.52 to 1.61 and a haze of 40% or less, with
(B) 5 to 40 parts by weight of a polyether ester which is substantially immiscible with the thermoplastic resin (A) and which is composed mainly of:
(B1) an aromatic dicarboxylic acid component not having sulfonic acid salt group,
(B2) at least one compound component having a sulfonic acid salt group, selected from the group consisting of a dicarboxylic acid compound component represented by the following formula (1)

wherein Ar is a trivalent aromatic group having 6 to 20 carbon atoms, and $M^+$ is a metal ion, a tetraalkylphosphonium ion or a tetraalkylammonium ion,
and a glycol compound component represented by the following formula (2)

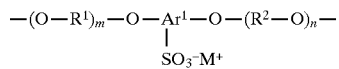

wherein $R^1$ and $R^2$ are each independently a bivalent alkylene group having 2 to 4 carbon atoms; m and n are each independently an integer of 1 to 20; $Ar^1$ is a trivalent aromatic group having 6 to 20 carbon atoms; and $M^+$ is a metal ion, a tetraalkylphosphonium ion or a tetraalkylammonium ion,
(B3) a glycol component having 2 to 10 carbon atoms, and
(B4) at least one polyalkylene oxide component having a number-average molecular weight of 200 to 50,000, selected from the group consisting of a poly(alkylene oxide) glycol component, a poly (alkylene oxide) glycol bis(carboxymethyl) ether component and a polyoxyalkylene glycol mono-2,3-dihydroxypropyl ether component, and
(C) 0.5 to 10 parts by weight of an ionic surfactant,
and wherein the difference in refractive index between the thermoplastic resin (A), the mixture of the polyether ester (B) and the ionic surfactant (C) in the compounded amounts is 0.04 or less, and wherein the thermoplastic resin composition has a haze of 40% or less and a surface resistivity of $1 \times 10^1$ to $1 \times 10^{14}$ ohm/□.

* * * * *